United States Patent
Stanger

(10) Patent No.: US 9,499,225 B2
(45) Date of Patent: Nov. 22, 2016

(54) FLEXIBLE HAND GUARD

(71) Applicant: Takie Adonis Stanger, Boise, ID (US)

(72) Inventor: Takie Adonis Stanger, Boise, ID (US)

(*) Notice: Subject to any disclaimer, the term of this patent is extended or adjusted under 35 U.S.C. 154(b) by 0 days.

(21) Appl. No.: 14/799,075

(22) Filed: Jul. 14, 2015

(65) Prior Publication Data

US 2016/0046342 A1  Feb. 18, 2016

Related U.S. Application Data

(60) Provisional application No. 62/036,735, filed on Aug. 13, 2014, provisional application No. 62/024,095, filed on Jul. 14, 2014.

(51) Int. Cl.
*B62K 21/12* (2006.01)
*B62J 23/00* (2006.01)

(52) U.S. Cl.
CPC ............. *B62J 23/00* (2013.01); *B62K 21/12* (2013.01); *B62K 21/125* (2013.01)

(58) Field of Classification Search
CPC ...... B62J 23/00; B62K 21/12; B62K 21/125; B62K 21/14; B62K 21/145; B62K 21/16; Y10T 74/20786; Y10T 74/20822
See application file for complete search history.

(56) References Cited

U.S. PATENT DOCUMENTS

| | | | |
|---|---|---|---|
| 568,024 A | 9/1896 | Gorman | |
| 706,343 A | 8/1902 | Radcliffe | |
| 2,063,493 A | 12/1935 | Douglas | |
| 2,591,523 A | 4/1952 | Dick | |
| 3,832,912 A | 9/1974 | Edwards | |
| 4,141,567 A | 2/1979 | Scott | |
| 4,438,661 A | 3/1984 | Cullen | |
| D319,992 S | 9/1991 | Acerbis | |
| 5,377,558 A | 1/1995 | Harris | |
| 5,740,700 A | 4/1998 | Redmond | |
| 7,644,642 B2 | 1/2010 | Paris | |
| 8,534,159 B2 | 9/2013 | Laivins et al. | |
| 8,820,191 B2 * | 9/2014 | Laivins | B62J 23/00 74/551.8 |
| 2007/0137409 A1 | 6/2007 | Laivins et al. | |
| 2008/0141821 A1 | 6/2008 | Degarate et al. | |
| 2014/0123804 A1 * | 5/2014 | Robins | B62K 21/145 74/551.1 |
| 2016/0046343 A1 * | 2/2016 | Ross | B62K 21/12 74/551.8 |

FOREIGN PATENT DOCUMENTS

| | | | | |
|---|---|---|---|---|
| DE | EP 2384960 A1 * | 11/2011 | ............. | B62J 23/00 |
| DE | 202010006315 U1 * | 12/2011 | ............. | B62J 23/00 |
| FR | EP 2289790 B1 * | 1/2014 | ............. | B62J 23/00 |

OTHER PUBLICATIONS

Machine translation of EP 2384960 A1 obtained on Jun. 3, 2016.*

* cited by examiner

*Primary Examiner* — Adam D Rogers
(74) *Attorney, Agent, or Firm* — Shaver & Swanson, LLP; Robert L. Shaver

(57) ABSTRACT

A protective hand guard for use on a vehicle with handlebars. The disclosed protective hand guard is attached at one end to the end of the handlebars and at another end to a clamping structure. The attachment to the clamping structure, which is on the inside end of the handlebars is by a cable which allows some movement when placed under pressure. The cable can be a steel cable, a pair of steel cables or other structures which are generally rigid but provide a small amount of flexion. The outer end of the hand guard can be attached to the outer tip of the handlebar in a rotating mount.

4 Claims, 2 Drawing Sheets

FLEXIBLE HAND GUARD

PRIORITY/CROSS-REFERENCE TO RELATED APPLICATIONS

This application claims the benefit of U.S. Provisional Application No. 62/036,735, filed Aug. 13, 2014 and U.S. Provisional Application No. 62/024,095, filed Jul. 14, 2014 the disclosure of which is incorporated by reference.

TECHNICAL FIELD

The presently disclosed technology relates to handlebars, specifically to shock absorbing hand guards on handlebars such as on motorcycles.

BACKGROUND

Hand guards on handlebars are known, especially in certain areas of motorcycle technology. One form of hand guards is in the form of convex outer surface guard made of plastic which protects the rider's hand and is typically used on off-road motorcycles to protect the user's hands from wind, mud, stones, gravel and other dangerous projectiles thrown by the rear wheels of preceding motorcycles. Such hand guards are also useful for protecting the user's hand from brush the rider may be passing through, and may also provide protection for the hand and brake and clutch levers when the rider is involved in a crash. Other vehicles besides motorcycles also have handlebars, such as ATVs, off-road vehicles, snowmobiles, bicycles, and others.

The concern with certain types of hand guards on handlebars is that in the case that the rider is thrown over the handlebars, that a hand may become entrapped in the hand guard, which would be undesirable.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

Disclosed is a hand guard for a handlebar such as used on a motorcycle that is designed to move in the event of a crash. This technology is also applicable to ATVs, off-road vehicles, snowmobiles, bicycles, and other vehicles which have handlebars. This provides protection for a rider's hand, but doesn't break when the vehicle is crashed or is struck by an object. The hand guard features a first member that is elongate, generally L shaped, and has a first end and a second end and a curve near the first end. The first end attaches to the outside end of a handlebar to allow the hand guard to rotate around the handlebar. This attachment can be attached to the end of the handlebar with a bolt threaded into the handlebar or a wedging device to secure it in a way that allows rotation around the handlebar, or could be other mechanisms that allow the hand guard to rotate around the handlebar. The curve of the hand guard is located at a position sufficiently far from the first end to allow a user's hand to grasp the handlebar and operate the motorcycle controls without contacting the hand guard.

The second end of the hand guard extends from the curve to a point near the center of the handlebar. The curve can be of a multitude of angles as long as the distance between the hand guard and handlebar remain sufficient to allow the user's hand to operate the controls. In one alternative embodiment the first end and the second end are created of separate pieces. The curve is most commonly created by bending the metal but could be created by welding or physically connecting the two pieces together.

A second member that has a proximal end and a distal end is positioned near the center of the handlebar. The proximal end of the second member is configured to attach to the motorcycle's handlebar, near the center of the handlebar. The second member extends outwardly away from the handlebar in a direction similar of the direction the first end of the first member extends from the handlebar. The second end of the first member and the distal end of the second member are configured to be located in close proximity to one another when both are correctly installed.

In order to connect the second end of the first member and the distal end of the second member, a flexible connector is used. This flexible connector can be many materials such as wire rope steel cable or wire braided rubber hose, as long as the material is somewhat flexible and allows the first member to pivot slightly when sufficient force is applied. This flexible connector along with the rotatability of the first member around the handlebars allows the hand guard to give a little in the event of a crash, allowing the hand guard to not become bent or deformed if the user crashes. It is also more forgiving if the users arm or wrist goes between the handlebar and the hand guard in the event of a crash. Other materials that can be used as a flexible connector include rubber hose, rubber tubing, or materials similar to a fan belt, having string and rubber or similar material.

As one potential connection, the distal end of the second member can include a recessed area. This recessed area would be configured to accept the flexible member within it. In order to secure the flexible member, various mechanisms can be used, with a preferred embodiment being the use of a set screw placed within the distal end and extending into the recessed area. Swaging or securing with epoxy resin are other acceptable securing techniques. A similar mechanism can be used to secure the flexible member to the first member. In this manner the set screw passes from outside of the second member and applies a securing force to the flexible member. Additionally, the recessed area can extend through the second member and still utilize a set screw to secure the flexible member.

The hand guard can also feature a third member having a primary end and a secondary end. The third member can be used to form the connection between the first member and the flexible connector. In this way the secondary end is connected to the flexible member and can use a similar connection mechanism as discussed above with the set screw in the recessed area or can use other connections similar to the first member. It is also foreseeable that the connection between the third member and the first member could be rotatable. This would allow another axis of movement as the hand guard pivots around the flexible member and rotates around the handlebar.

In addition, many types of material can be used in order to create the hand guard. Metals such as aluminum or stainless steel or other sufficiently strong metals can be used as well as other materials, such as carbon fiber, plastics, or other alloys or combinations thereof. It is further advantageous to attach a hand guard to each end of the handlebar.

In this configuration the second hand guard is preferably a mirror image of the first hand guard.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

Figure 1:
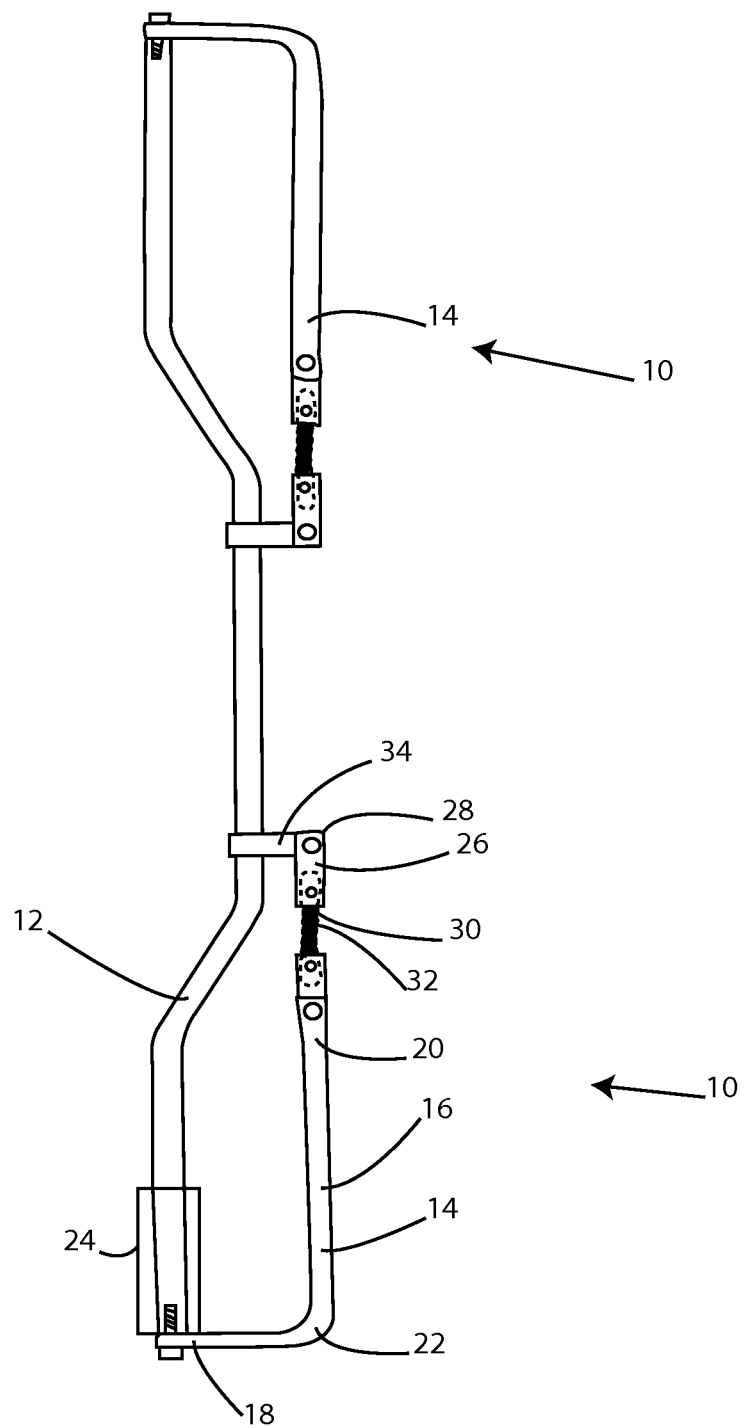
FIG. 1 is a top view of the disclosed hand guard on both ends of a motorcycle handlebar.

While the presently disclosed technology is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Shown in the figures are certain preferred embodiments of the disclosed hand guard. Shown in FIG. 1 is a motorcycle handlebar 12 with attached hand guards 10. The left and right hand guards 10 are mirror images of each other. The hand guards 10 shown in FIG. 1 have a first member 16 which has a first end 18 and a second end 20. The first end and the second end are joined by a curved section 22. The first end 18 of the hand guard is attached near the distal end of the motorcycle handlebar 12 and extends forward from the motorcycle handlebar, thus providing protection from objects that would hit the users hands from the front.

Shown in FIG. 1 is a hand grip 24, which represents where the motorcycle rider's hand would be positioned. The hand guard 10 is positioned in front of the user's hand, to protect the user's hand from brush, sticks, rocks and from physical impact with the ground in case the rider falls. The hand guard 10 has second member 26 which attaches to the inner region of the handlebar by a third member, also called a clamp 34. The second member 26 has a proximal end 28 and a distal end 30, and attaches to the motorcycle handlebar 12 at a point near the center of the handlebar.

The first member 16 can be made of a number of materials, such as aluminum, steel, titanium, composite, and plastic.

Between the second member 26 and the first member 16 is a flexible connector 32. The flexible connector can be made of a number of relatively stiff materials, but which provide a certain amount of flex if enough force is presented to them. One material which is useful as the flexible connector is steel cable, with the cable having a diameter of approximately ⅜ inch or 10 millimeters being suitable and preferred. The second member 26 can be made up of one piece or two pieces, with one of the pieces including a clamp 34 which attaches directly to the motorcycle handlebar 12.

Figure 3:
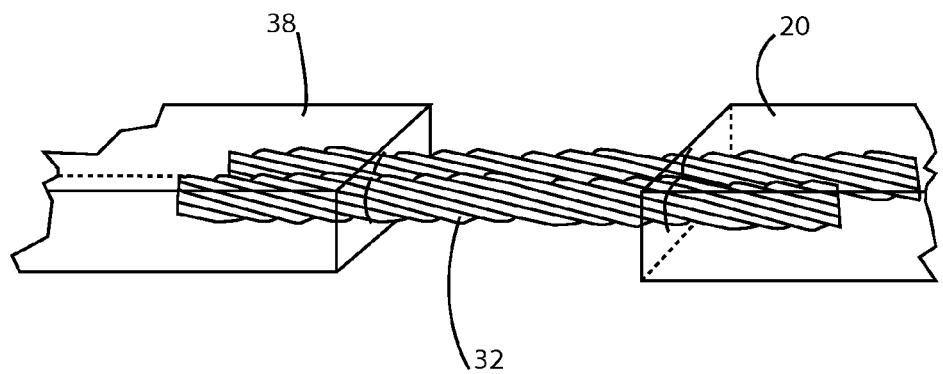
FIG. 3 is perspective view of one type of flexible connector.

Other types of material can be used for the flexible connector 32, including smaller cables, in pairs such as is shown in FIG. 3, or other stiff material such as a composite similar to the material which makes up fan belts of automobiles. Cables of brass, Kevlar, aramid, nylon and other materials which have some flex are also suitable as the flexible connector 32. The flexible connector 16 can also be tubular in form, such as nylon or Kevlar tubes, and can be shapes other than round in cross section, such as square or rectangular cross section bars of composite, nylon, Kevlar, or other suitable flexible material.

Figure 2:
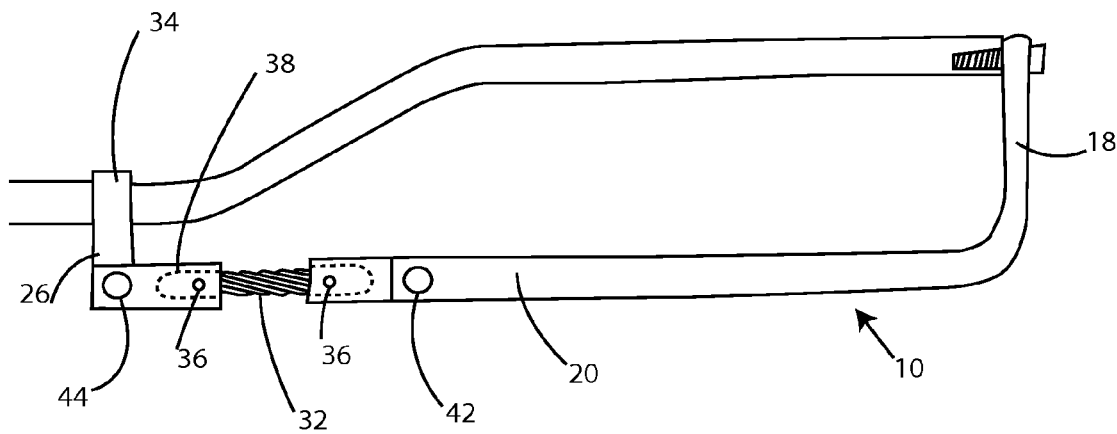
FIG. 2 is a top view of one hand guard on one side of a motorcycle handlebar.

FIG. 2 shows a closer view of the hand guard 10, with the flexible connector 32 comprising an inner arm 38 and outer arm 40, with the inner arm 38, outer arm 40, and flexible member 32 attached to the first member 16 by a bolt 42 and a bolt 44. With this configuration, the flexible member 32 is replaceable in case it is damaged in a crash. Set screws 36 are shown, and provide one way to secure material forming the flexible connector such as steel cable into bored out recess made to hold the ends of the steel cable. The set screws can press against the steel cable making up the flexible connector, or they can force a plate against the steel cable to secure it in in the first and second members. If the flexible connector is tubular of square or rectangular in cross section, set screws configured for those shapes would be used.

Shown in FIG. 2 is the first end 18 of the first member 16 attached to the end of the handlebar 12. The attachment allows the first member to rotate. The combination of rotation and flexing at the flexible connection 32 results in a hand guard that tends to survive more crashes and impacts without breaking.

FIG. 3 shows an optional form of flexible connection, in which more than one cable is used. Two cables are shown in FIG. 3, but 3 or 4 cables may also be preferred in some configurations.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A hand guard for a handlebar comprising:
   a first member having a first end and a second end, and a curve nearer said first end than said second end, attachable to an end of said handlebar and extending forward from said handlebar;
   said first end of said first member having an attachment mechanism configured for rotatable attachment adjacent the end of the handlebar and extending forward from the handlebar;
   a second member having a proximal end and a distal end, said proximal end configured to attach to said handlebar in the approximate center of the handlebar, said second member extending outwardly and forward from the handlebar;
   a flexible connector configured to connect said second end of said first member and said distal end of said second member, with said flexible connector configured to flex when impacted, said first member and said flexible connector configured to allow said first member to rotate and flex when said first member is impacted by an object, wherein said flexible connector is a twisted metal cable.

2. The hand guard of claim 1 further comprising:
a recessed area formed in said distal end of said second member, said recessed area configured to accept said flexible connector;
a set screw placed in said distal end of said second member, said set screw configured to attach said flexible connector within said recessed area.

3. The hand guard of claim 1 further comprising:
a third member having a primary end and secondary end, said third member forming the connection between said first member and said flexible connector, said primary end being connected to said first member and said secondary end being connected to said flexible connector.

4. The hand guard of claim 1 further comprising:
a third member having a primary end and secondary end, said third member removably connected to said first member and removably connected to said second member, and comprising said flexible member, with said third member replaceable.

\* \* \* \* \*